United States Patent
Kujawa et al.

(10) Patent No.: US 6,731,327 B1
(45) Date of Patent: May 4, 2004

(54) DYNAMIC STRUCTURAL COUPLING MECHANISM FOR REDUCING OPTICAL DEGRADATION IN VIBRATING ENVIRONMENTS

(75) Inventors: Thomas Joseph Kujawa, Fremont, CA (US); Ching-Lang Chiang, Saratoga, CA (US); Neeraj Khurana, Monte Sereno, CA (US); Prasad Sabbineni, Fremont, CA (US); Daniel T. Hurley, San Ramon, CA (US)

(73) Assignee: Hypervision, Inc., Fremont, CA (US)

( * ) Notice: Subject to any disclaimer, the term of this patent is extended or adjusted under 35 U.S.C. 154(b) by 486 days.

(21) Appl. No.: 09/449,023

(22) Filed: Nov. 24, 1999

Related U.S. Application Data

(63) Continuation-in-part of application No. 09/248,783, filed on Feb. 12, 1999, now abandoned.

(51) Int. Cl.[7] .................................................. H04N 7/18
(52) U.S. Cl. .................................................. 348/80
(58) Field of Search ............................. 248/562, 580; 250/306, 307, 311; 267/35; 269/74; 324/750, 754, 755, 757, 758, 763, 765; 348/79–80, 125–126; 356/311; 359/382, 823; H04N 7/18

(56) References Cited

U.S. PATENT DOCUMENTS

| | | | | |
|---|---|---|---|---|
| 4,223,762 A | * | 9/1980 | Gertal | 248/580 |
| 4,302,087 A | | 11/1981 | Reinheimer et al. | 354/79 |
| 4,680,635 A | | 7/1987 | Khurana | |
| 4,811,090 A | | 3/1989 | Khurana | |
| 4,927,125 A | * | 5/1990 | Hunter | 269/74 |
| 5,296,704 A | | 3/1994 | Mishima et al. | |
| 5,301,006 A | * | 4/1994 | Bruce | 356/311 |
| 5,410,259 A | | 4/1995 | Fujihara et al. | |
| 5,436,571 A | | 7/1995 | Karasawa | |
| 5,475,316 A | * | 12/1995 | Hurley et al. | 324/750 |
| 5,521,522 A | | 5/1996 | Abe et al. | |
| 5,536,941 A | * | 7/1996 | Swann | 250/311 |
| 5,549,269 A | * | 8/1996 | Gertel et al. | 267/35 |
| 5,705,814 A | * | 1/1998 | Young et al. | 250/306 |
| 5,764,409 A | | 6/1998 | Colvin | |
| 6,113,056 A | * | 9/2000 | Armstrong | 248/562 |

* cited by examiner

*Primary Examiner*—Richard Lee
(74) *Attorney, Agent, or Firm*—Beyer Weaver & Thomas, LLP

(57) ABSTRACT

Vibration damping apparatus for vibrating environment such as a light emission microscope and an integrated circuit test head includes a rigid member with remotely controlled clamping apparatus attached to spaced portions of the member. The clamping apparatus engage the microscope and the test head for reducing vibrations, and the clamping apparatus can be readily deactivated for moving the microscope or the test head for alignment purposes. Advantageously, two or more rigid members including pneumatic cylinders can be positioned around the device under test while permitting the use of mechanical probes for engaging nodes of an integrated circuit for test purposes.

12 Claims, 6 Drawing Sheets

DYNAMIC STRUCTURAL COUPLING MECHANISM FOR REDUCING OPTICAL DEGRADATION IN VIBRATING ENVIRONMENTS

The application is a continuation-in-part of copending application Ser. No. 09/248,783 filed Feb. 12, 1999 now abandoned for Dynamic Structural Coupling Mechanism for Reducing Optical Degradation in Vibrating Environments.

BACKGROUND OF THE INVENTION

This invention relates generally to the use of optics for testing semiconductors and integrated circuits for defects, and more particularly the preferred embodiment of this invention relates to use of a video microscope assembly for emission microscopy comprised of an objective lens, optic tube, video imaging system (CCD or similar imager) and a microscope movement on a vibrating integrated Circuit Test Head (ATE, Automatic Test and Evaluation) test head.

Light emission microscopy is used to detect defects in integrated circuits. See U.S. Pat. Nos. 4,680,635, 4,755,874, 4,811,090 and 5,475,316 for example. Briefly an emission microscope operates on the principle of detection of recombinant radiation. In an excess current drawing condition electron hole and pairs recombine and relax giving off cold photon emissions which can be detected using specialized CCD based sensors. The procedure is performed on wafers and on decapsulated (mold compound removed) or de-lidded ceramic packages viewing the die traditionally from the frontside but also through the backside of the silicon.

The procedures primary function is failure localization. The test can be run as simply as providing power and ground to the chip to evaluate standby leakage. The preferred embodiment of this invention particularly relates to the use of ATE test heads to send streams of test vectors to exercise the chip and bring it into a failing logic state. But any vibrating environment could apply. Without the capability of dynamically sending test vectors to "bring on" the defect state via the ATE head, the chip will not fail. Inherent to this operation is the use of ATE test heads, which when running are cooled with fans or liquids and run often on raised computer floors. In the use of an emission microscope on a test head magnifications to 1500× are produced by bringing objective lenses close to the chip to collect light and pass it on the CCD detector. The vibration inherent on test heads limits significantly the overall magnification achievable due to optical degradation.

A portable emission microscope was described in U.S. Pat. No. 5,475,316 for example which is used by conjunction with ATE test heads but separate from the ATE head when operating through the use of an offset. Means must be provided to for damping or coupling vibrations to eliminate distortion due to relative motion between the microscope and the test head.

U.S. Pat. No. 5,764,409 discloses the use of interlocking cylinders that telescope in front of the objective lens and couple the vibration of the ATE head into the cylinder by means of simple friction thereby reducing vibration between microscope and test head. Shown in FIG. 1, the microscope 301 is threadably coupled through collar 401 to cylinder 406 which in turn threadably engages a second cylinder 403 which contacts test head surface 408 in pressure attachment through simple friction.

Copending application Ser. No. 09/248,783, supra, is directed to couple optics (optical tube and or objective lenses) in use on vibrating ATE test heads thereby eliminating relative motion between the two with the net effect of eliminating optical distortion in the CCD or sensor image plane. The preferred embodiment also simplifies focusing and provides greater access to the region within the field of view of the optic for microprobing or exchange of the devices from within test sockets. Further, to any one skilled in the art of semiconductor analysis, access to the devices under the field of view of the optics is essential for microprobing individual lines, junctions or bond pads. Microprobing with needles is achievable through the application of the preferred embodiment of this invention and is an improvement over the prior art.

The present invention is an improved embodiment of the invention described in copending application Ser. No. 09/248,783.

SUMMARY OF THE INVENTION

Briefly, in accordance with light emission microscope already established, the objective lenses must be within its working distance (typically 12–75 mm) of the device under test (DUT) semiconductor. The DUT is on top of a vibrating ATE test head, in a socket, or in wafer form; is on a chuck in a wafer sorter docked to the ATE head. In all case vibration is present through the floor to the tester and by fans and cooling within the test head itself. The objective and the optical tube to which they are attached are coupled to a motorized drive to allow for X and Y positioning and Z axis control of focus. This assembly is referred to as the microscope movement. The movement itself is rigidly attached to a solid mechanism that fully supports the static load of the optics and microscope movement. This rigid mechanisms provides an undesirable path for transferring vibration (either test floor, test head or both) into the objective lens through the path described above.

A vibration coupling assembly is provided which is dynamic in nature and which operates under computer control. This mechanism is composed of a rigid assembly which provides on one side, direct coupling to the microscope and secondly, direct coupling to the test head when actuated. This rigid assembly and its points of engagement provide a vibration damping coupling of the microscope to the test head.

In a preferred embodiment, the vibration coupling assembly includes a plurality of piston driven rods coupled to the microscope with the rods engaging the test head when the pistons are actuated. The pistons can be driven pneumatically, hydraulically, or by solenoid, for example. A mount is provided for attaching the plurality of piston driven rods to the microscope, and the mount can include a plurality of pivotal arms on which the plurality of piston driven rods are attached whereby the plurality of piston driven rods can have variable spacing when engaging the test head.

The invention and objects and features thereof will be more readily apparent from the following detailed description and appended claims when taken with the drawings.

DETAILED DESCRIPTION OF ILLUSTRATIVE EMBODIMENTS

Figure 1:
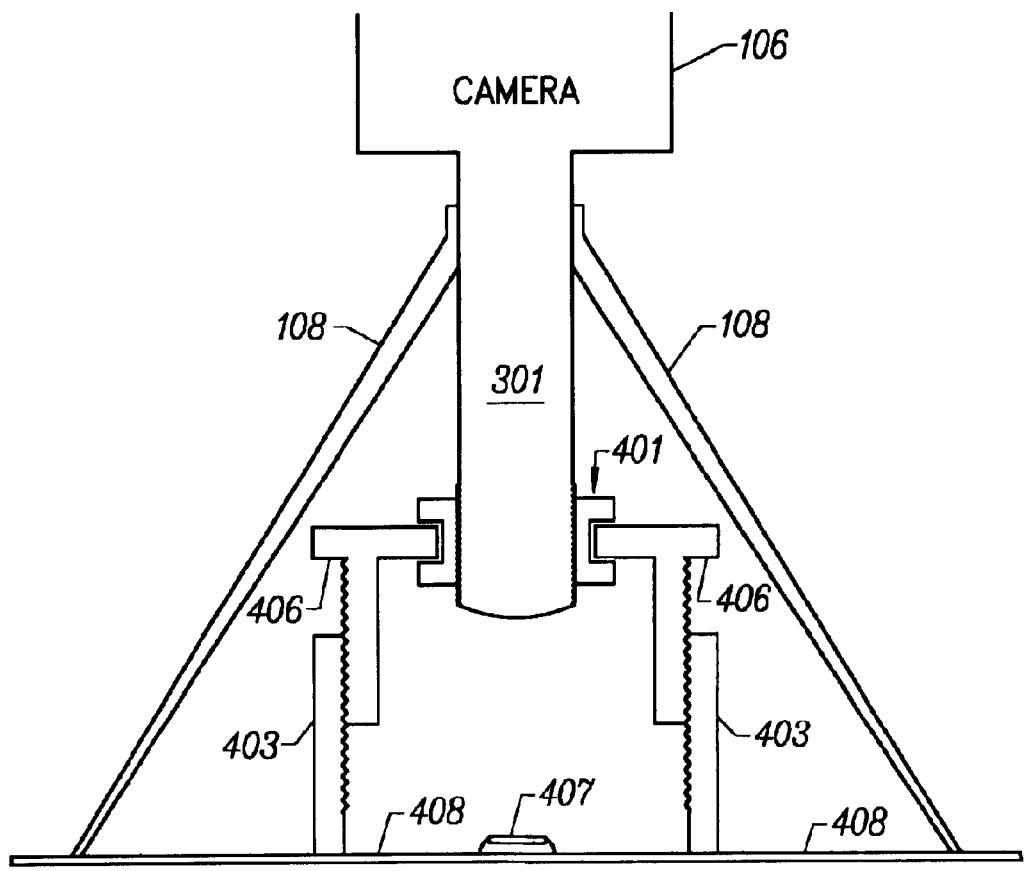
FIG. 1 is a side view partially in section illustrating vibration damping between an emission microscope and a test head in accordance with the prior art.

Referring now to FIG. 1, from the prior art under U.S. Pat. No. 5,764,409, disclosed is the use of interlocking cylinders that telescope in front of the objective lens and couple the vibration of the ATE head into the cylinder by means of simple friction thereby reducing vibration between microscope and test head. As shown in FIG. 1, the microscope 301 and camera 106 are threadably coupled through collar 401 to cylinder 406 which in turn threadably engages a second cylinder 403 which contacts test head surface 408 in pressure attachment through simple friction. Test head surface 408 and a device under test (DUT) 407 are within an optical shroud 108.

Figure 2:
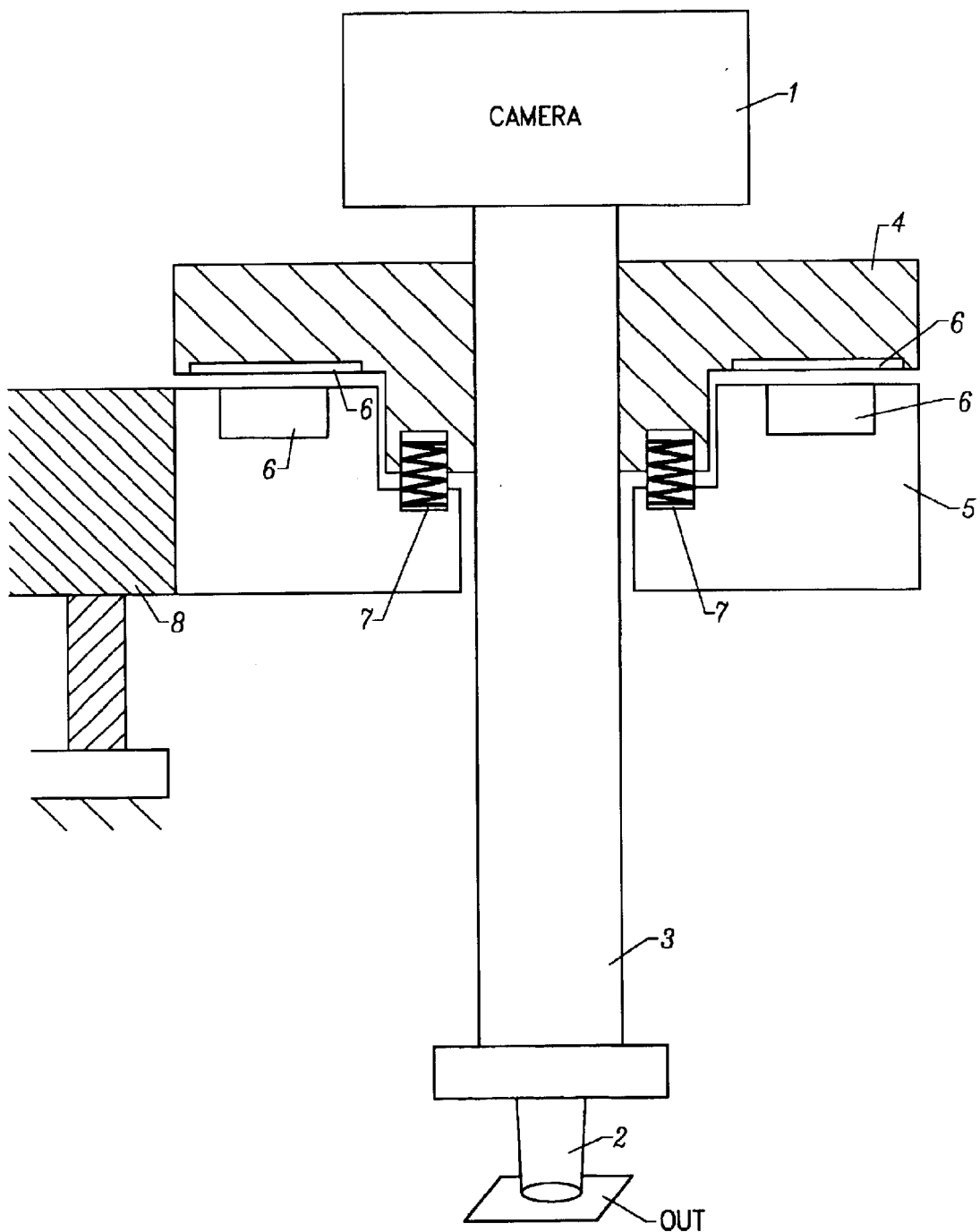
FIG. 2 is a side view partially in section of the MOD Microscope Optic Decoupler in accordance with one embodiment of the present invention.

Referring now to FIG. 2, an emission microscope comprised of an optic tube assembly 3, objective lens 2 and camera 1 mounted on a rigid mechanism 8 are positioned above a test head and a device under test DUT. As is conventional in microscopes the movement of the microscope to navigate above the DUT is accomplished in 3 axes (X, Y, Z) for focus and has been described in prior U.S. Pat. No. 5,475,316 (not shown in drawing).

In accordance with one embodiment of the invention, the MOD Microscope Optic Decoupler includes a rigid mechanism 8 which supports a microscope movement 5. The objective 2 is mounted onto the optic 3 and in turn the camera 1 is mounted to the optic tube comprising an assembly referred to herein as the optical path. The optical path is rigidly attached to an assembly 4 that is offset from the microscope movement through a set of springs 7. These springs are designed to be compliant while at the same time providing static support of the optical path. During operation of the MOD, decoupling of the rigid mechanism by releasing electromagnet assemblies 6 allowing the microscope movement 5 to float on the springs 7 decoupling the optical path from its rigid support 8. Such magnets are well known and commercially available such as a Multacc™ 90-280 electromagnet which is operated remotely via computer control of a 6 volt power supply in our preferred embodiment. An alternate embodiment could be pneumatically actuated clamping remotely actuated via computer and would work equally as well. During any movement of the stage for positioning of the optical path the electromagnets 6 are clamped attaching the microscope movement to the optical path so it can be effectively moved as a single structure and without compliance. During imaging when vibration is critical the MOD is decoupled. Specifically, electromagnet assemblies 6 are released allowing the camera 1, optical tube 3 and objective 2 to float above the microscope movement 5. In a second preferred embodiment the assembly 4 could be directly attached to the CCD sensor 1 instead of to the CCD through the optical tube with the identical affect. Decoupling removes the contribution of low frequency vibration (building, structural vibration) contributed by the rigid support mechanism 8.

Figure 3:
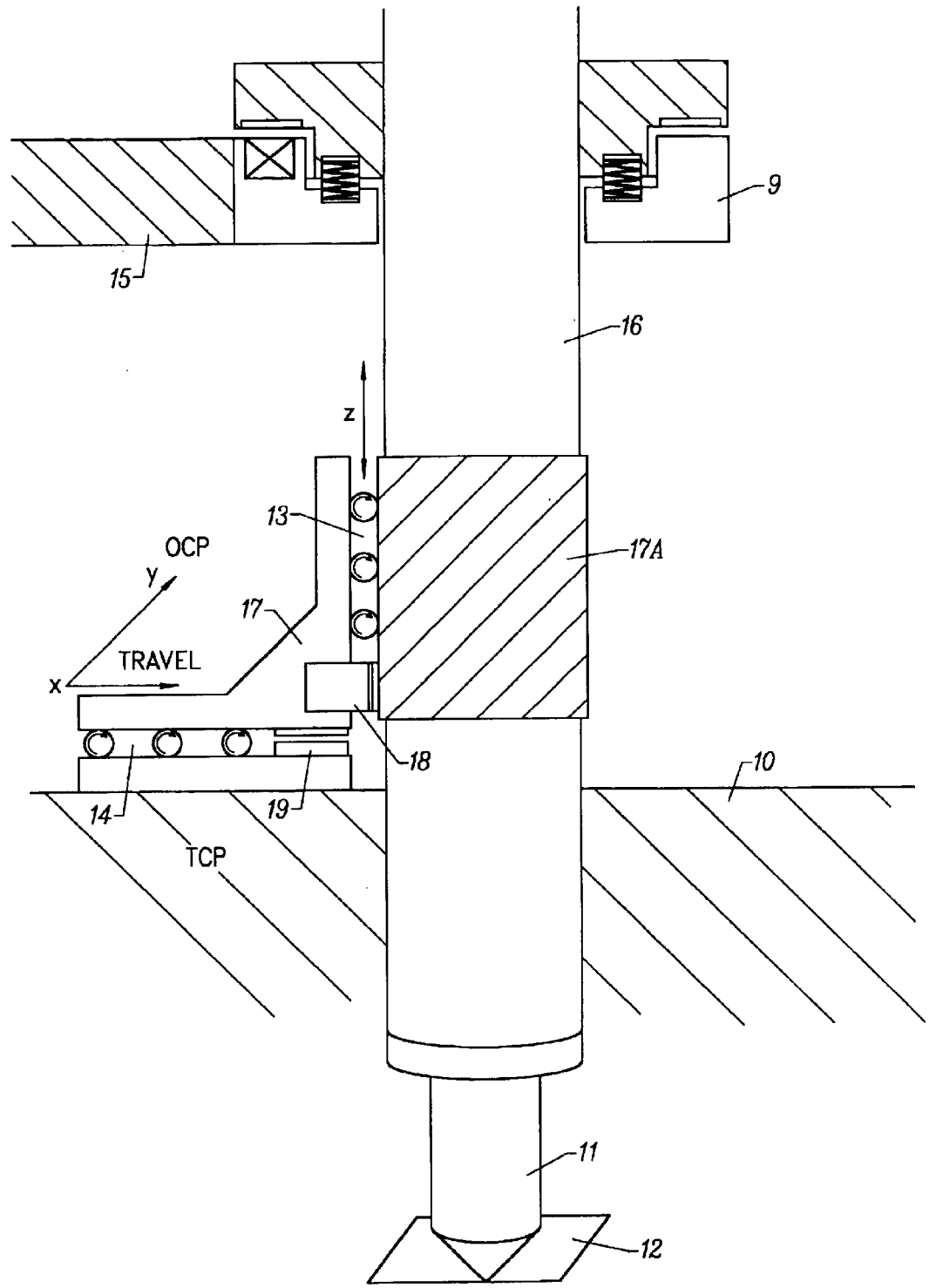
FIG. 3 is a side view partially in section illustrating the OCP Optical Coupling Point and TCP Tester Coupling Point and its relation to the test head, optics, device under test and MOD (see FIG. 2) in accordance with one embodiment of the present invention.

FIG. 3 provides this illustration provides a descriptive cross sectional view of one preferred embodiment of the invention. The MOD 9 is described above and attached to the rigid support mechanism 15. The objective 11 is viewing the device under test DUT 12. The objective 12 is attached to the optic tube 16 and not shown is the CCD (see FIG. 2, number 1). This assembly we will refer to for simplicity as the optical path. The optical path in turn is attached to the MOD 9 from which it can decouple remotely under computer control by electromagnet release 6 (FIG. 2). When the MOD is decoupled the contribution of the vibration from the rigid mechanism 15 is removed by allowing the optic tube to float freely on its compliant springs 7 (FIG. 2). A rigid member 17 supports an XY stage movement and in turn is rigidly attached to the objective 11 or optical tube 16 at any point via a plate 17A attached to the optic tube. Bearing assembly 13 provides freedom of Z-axis motion to allow the rigid member to slide facilitating focus of the microscope. Electromagnet assembly 18 similarly described in FIG. 2 provides a method of clamping the rigid member 17 directly to the optic tube 16 or objective 11 through its rigid attachment point 17A. This point is referred to this embodiment of the invention as the OCP or optical coupling point. The electromagnet 18 when released allows the microscope to be focused allowing the bearings 13 at the OCP to move in the Z-axis. Similarly the electromagnet assembly 18 under remote control could be a pneumatically actuated clamping device with identical performance.

The test head 10 supports rigid member 17 which in turn supports an XY stage movement through bearings 14 aligned in the X and Y-axis (only one axis is shown in the drawing) at a point we refer to as the TCP, Tester Clamping Point. This is the point of attachment to the vibrating structure or ATE test head in our preferred embodiment. The test heads vibration will be transferred into the objective 11 or optic tube 16 from the TCP thereby eliminating relative motion. The TCP comprises a rigid attach point to the test head for this primary purpose. The X and Y movement of the rigid stage is comprised of member 17 floating on bearings 14 aligned in two axis X and Y and provides the function of allowing the microscope movement to navigate over the surface of the DUT 12 without resistance. Electromagnets already previously described in FIG. 2 are used to clamp the TCP to a ferromagnetic plate affixed to the test head. In our preferred embodiment the attachment point is at the test head but can have alternate attach points on the tester chassis, load board of framework of the test head.

In the described embodiment as an emission microscope on an ATE head, the invention allows for three modes of operation involving the MOD, OCP and TCP described in detail below:

a. Coarse microscope movement

Referring to FIG. 2 the MOD 9 is clamped using electromagnets 6 under remote control coupling the microscope movement 5 to the optical path 4 and provide the needed rigidity for XY positioning and focus.

Referring to FIG. 3 the OCP 13 and TCP 14 are unclamped by remotely releasing electromagnets 18 and 19 allowing the bearing assembly at the OCP to travel in Z and the bearing assembly 14 at the TCP to freely travel in XY facilitating focus and navigation functions.

b. Focus Mode

Referring to FIG. 2 the MOD 9 is unclamped using electromagnets 6 under remote control uncoupling the microscope movement 5 from the optical path 4 thereby eliminating the contribution of vibration from the rigid mechanism 8.

Referring to FIG. 3 the OCP 13 is unclamped by remotely releasing electromagnets 18, allowing the bearing assembly at the OCP to travel in Z. The bearing assembly 14 at the TCP is clamped using remotely controlled electromagnets 19 thereby preventing XY movement of the objective 11 and optic tube 16.

c. Imaging Mode (Full Vibration Coupling)

Referring to FIG. 2 the MOD 9 is unclamped using electromagnets 6 under remote control uncoupling the microscope movement 5 to the optical path 4 thereby eliminating the contribution of vibration from the rigid mechanism 8.

Referring to FIG. 3 the OCP 13 is clamped by remotely clamping electromagnets 18, preventing the bearing assembly at the OCP to travel in Z. The bearing assembly 14 at the TCP is also clamped using remotely controlled electromagnets 19 thereby preventing XY movement of the objective 11 and optic tube 16. The XYZ stage acts as a rigid assembly to transfer vibration from the test head 10 through the TCP 14 its rigid member 17 into the OCP 13 and onto plate 17 which is rigidly affixed to the optic. Vibration is transferred in this manner from the ATE head to the optic 16 or objective 11 and similarly to the CCD camera sensor 1 (FIG. 2). Referring to FIG. 3 with the MOD released the entire optical path including the objective 11 optical 16 and CCD sensor 1 (FIG. 2) are allowed to move with the vibration provided from the test head at the TCP 14. The net effect is that relative motion between the test head and optics is eliminated, providing undistorted optical images of the DUT 12 in this embodiment.

Figure 4:
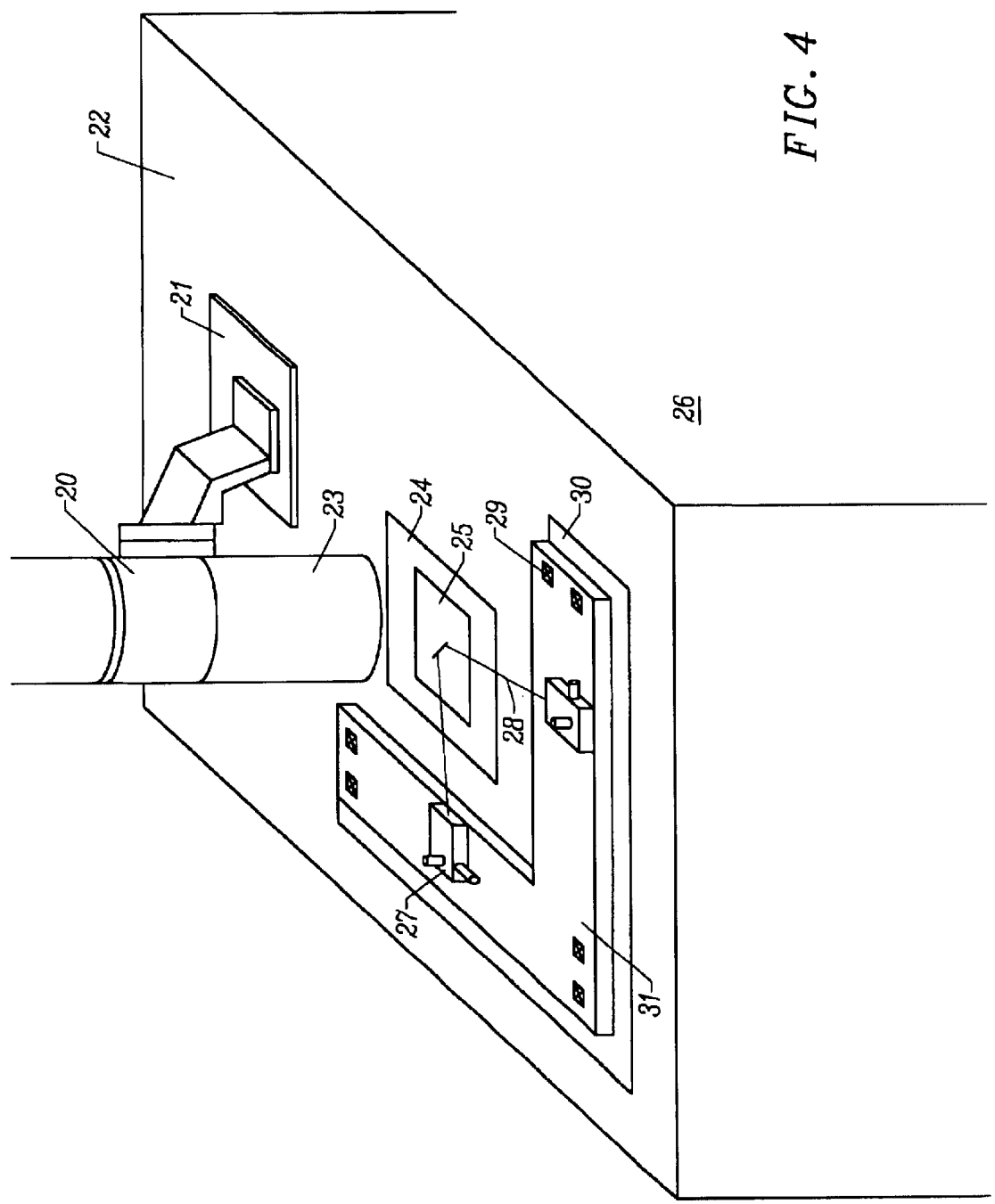
FIG. 4 is a top down illustration of the present invention showing the relationship of the OCP, TCP to the test head and the accessibility provided to the area under the field of view of the optics to allow for microprobing of the semiconductor die, in accordance with one embodiment of the present invention.

Referring now to FIG. 4 the ability to have access to the optical field of view without obstruction and to visualize the DUT without distortion is an apparent advantage to any one skilled in the art of semiconductor analysis as it allows the placement of microprobes in the following manner. Without the vibration coupling providing for the relative motion between the ATE head and the optics to be canceled, microprobing is impossible to achieve. Needle placement, which is a precise procedure and is unachievable as the image of the DUT relative to the microscope field of view, is in constant motion. FIG. 4 includes a rigid platform 22 and a test head 24 for device under test 25.

In this embodiment ferromagnetic plate 30 is affixed rigidly to the ATE test head, chassis or load board by obvious means. A polished finish platen assembly 31 is attached to this using electromagnets which can be manually engaged or obviously in a secondary embodiment of the patent with pneumatics. The purpose is to rigidly attach the platen 31 to the ferromagnetic plate 30 for the purpose of complete vibration coupling. A microprobe assembly 27 with a magnetic base or in a secondary embodiment a pneumatic or vacuum source is similarly affixed rigidly to the platen in a means intended to optimize vibration transfer. The probe arm assembly 28 is used to reach junction lines or bond pads on the DUT 25 for the purpose of biasing or measuring current and voltage from the DUT 25. As described vibration is transferred from the ferromagnetic plate via the electromagnetically 29 attached platen 30 transferring vibration into the microprobe assembly 27 and its related probe arm and needle 28 so that relative motion between these assemblies is eliminated. These structures in effect move in unison. To achieve microprobing the following is performed using the vibration mechanism previously described in FIG. 3. More particularly described above as the imaging mode for full vibration coupling.

This embodiment of the invention allows the user perspective clear imaging of a vibrating test head and now vibrating platen 30 microprobes 27 and related probe arm and needle 30 act to mirror the vibration from the tester identically. This vibration is effectively canceled by eliminating the relative motion through the OCP 20 and TCP 21 which are rigidly transferring vibration into the optic tube 23 (includes the objective 1) and optical tube 16 (FIG. 3). The user sees his needles without distortion and the optics move together via the vibration produced at the TCP 21. A critical element of the invention is the access provided to the DUT 25 for microprobing by allowing free access beneath the optics 23 and is an obvious improvement in the prior art seen in FIG. 1.

Figure 5:
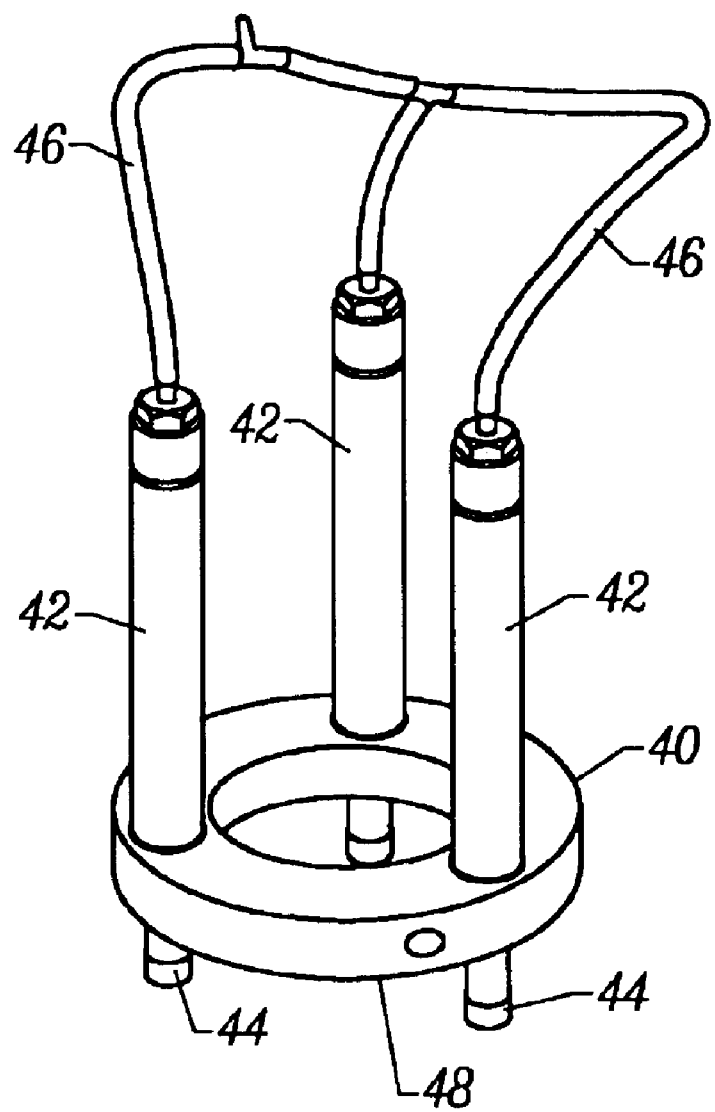
FIG. 5 is a perspective view of vibration damping apparatus in accordance with another embodiment of the invention.

Other embodiments of the invention illustrated in FIGS. 5 and 6 will now be described. In FIG. 5, the vibration damping apparatus comprises a collar 40 on which are mounted a plurality of pneumatic cylinders 42 from which piston driven rods 44 driven by internal pistons (not shown) depend. Pneumatic cylinders 42 are driven by air provided through conduit 46 for actuating the pistons. The pistons are spring biased to be in a raised position with the rods 44 drawn into the cylindrical housings with the pistons moved pneumatically to extend the rods 44 for engagement with a test head. Collar 44 has an annular configuration with an internal opening for positioning around the video microscope optics with set screws at 48 fastening collar 44 to the microscope housing.

While one cylinder can function for vibration damping, at least three cylinders are preferred whereby the extending rods of the cylinders engage a test head in planar arrangement.

Figure 6:
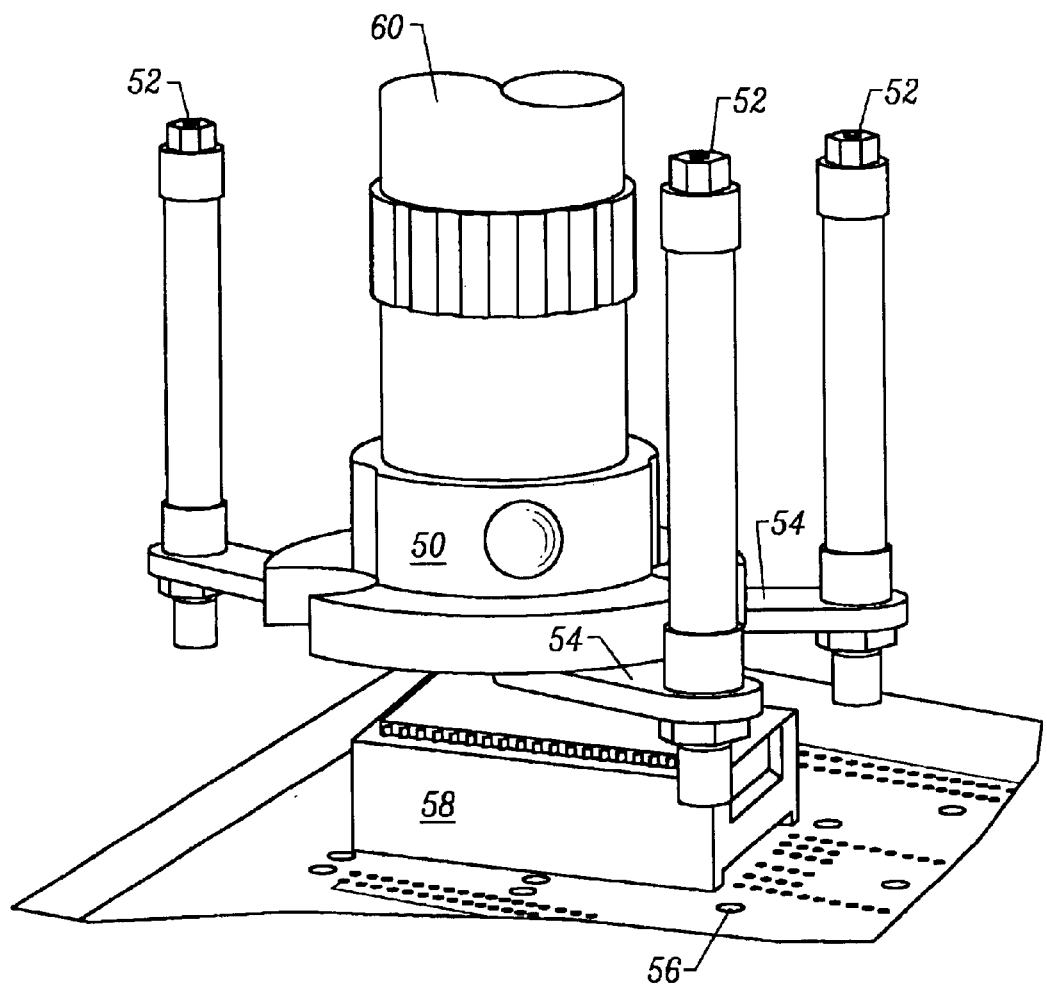
FIG. 6 is a perspective view of another embodiment of vibration damping apparatus illustrating a swivel mount of the apparatus to a microscope.

In FIG. 5, the pneumatic cylinders are rigidly affixed in mount 40, but other arrangements can be provided wherein the cylinders can be moved relative to the test head, as illustrated in FIG. 6. FIG. 6 again illustrates three pneumatic cylinders 52 attached to the housing of microscope 60 by means of a mount 50 which supports a plurality of pivotal arms 54 which are pivotally attached to mount 50 whereby the cylinders can be pivoted about mount 50 for variable positioning with respect to a test head 56. In this view a device under test 58 is provided under microscope 60 for light emission microscopy testing.

A suitable pneumatic cylinder for use in the vibration damping apparatus is available from Clippard Instrument of Cincinnati, Ohio, such as their minimatic model SSRO5-1 cylinder. Other suitable piston driven rods can be employed such as pneumatically driven pistons and solenoid driven pistons. This embodiment of the invention again allows the user access for microprobing by allowing free access beneath the optics.

While the invention has been described with reference to specific embodiments, the description of the invention is illustrative and not to be construed as limiting the invention. Various modifications and applications may occur to those skilled in the art without departing from the true spirit and scope of the invention as defined by the appended claims.

What is claimed is:

1. Test apparatus comprising
  a) an integrated circuit test head,
  b) a video optical microscope comprising an objective lens, and a video imager, c) a microscope movement apparatus for positioning the video optical microscope over the integrated circuit test head, d) a mounting means for holding the video optical microscope and microscope movement apparatus, and e) computer controlled clamping means attached between the video optical microscope and the integrated circuit test head, said clamping means being disabled during microscope movement but switched into a hard rigid mode during video image acquisition thereby firmly coupling the video optical microscope to the integrated circuit test head and reducing the relative motion between the video optical microscope and the integrated circuit test head, said clamping means comprising a plurality of piston driven rods coupled to the video optical microscope and which engage the test head when actuated.

2. The test apparatus as defined by claim 1 wherein the movement apparatus includes electrical motors, wherein the enabling of the electrical motors is coordinated with the enabling of the computer controlled clamping means.

3. The test apparatus as defined by claim 1 wherein the piston driven rods are driven pneumatically.

4. The test apparatus of claim 1 wherein the piston driven rods are driven hydraulically.

5. The test apparatus of claim 1 wherein the piston driven rods are driven by solenoid means.

6. A method of microprobing a semiconductor device on top of a integrated circuit tester, said method comprising a) viewing the semiconductor device through a video microscope, said video microscope comprising an objective lens and a video camera, b) connecting the video microscope to a microscope movement means which in turn are connected to a mounting means, c) microprobing using microprobing means which are rigidly placed on top of the integrated circuit tester, and d) vibration damping using a computer controlled clamping device which couples the integrated circuit tester to the video microscope, said clamping device being disabled when the video microscope is to be moved, and the clamping device being enabled when the movement is complete, allowing the video microscope to vibrate in unison with the tester, thereby reducing the relative motion between the microscope and tester, said vibration damping including using at least one piston driven rod coupled to the video microscope and which engages the integrated circuit tester when actuated.

7. Vibration damping apparatus for damping vibrations between an integrated circuit test head and a video optical microscope comprising a plurality of piston driven rods coupled to the video optical microscope with the rods engaging the test head when the piston driven rods are actuated, and means for computer controlling the piston driven rods during vibration damping.

8. The vibration damping apparatus as defined by claim 7 wherein the plurality of piston driven rods is three.

9. The vibration damping apparatus as defined by claim 7 wherein the piston driven rods are driven pneumatically.

10. The vibration damping apparatus as defined by claim 7 wherein the piston driven rods are driven hydraulically.

11. The vibration damping apparatus as defined by claim 7 wherein the piston driven rods are driven by solenoid means.

12. The vibration damping apparatus of claim 7 and further including a mount for attaching the plurality of piston driven rods to the video optical microscope, said mount including a plurality of pivotal arms to which the plurality of piston driven rods are attached whereby the plurality of piston driven rods can have variable spacing when engaging the test head.

* * * * *